United States Patent

Maybee et al.

(10) Patent No.: US 9,424,314 B2
(45) Date of Patent: Aug. 23, 2016

(54) METHOD AND APPARATUS FOR JOINING READ REQUESTS

(71) Applicant: Oracle International Corporation, Redwood City, CA (US)

(72) Inventors: Mark Maybee, Boulder, CO (US); Mark J. Musante, Westford, MA (US)

(73) Assignee: Oracle International Corporation, Redwood City, CA (US)

( * ) Notice: Subject to any disclaimer, the term of this patent is extended or adjusted under 35 U.S.C. 154(b) by 245 days.

(21) Appl. No.: 13/656,301

(22) Filed: Oct. 19, 2012

(65) Prior Publication Data

US 2014/0115089 A1   Apr. 24, 2014

(51) Int. Cl.
G06F 15/167    (2006.01)
G06F 17/30     (2006.01)

(52) U.S. Cl.
CPC .................. *G06F 17/30466* (2013.01)

(58) Field of Classification Search
USPC .................................................. 709/213, 217
See application file for complete search history.

(56) References Cited

U.S. PATENT DOCUMENTS

| 6,757,768 | B1* | 6/2004 | Potter et al. ................ 710/112 |
| 8,442,952 | B1* | 5/2013 | Armangau et al. .......... 707/686 |
| 2007/0286199 | A1* | 12/2007 | Coteus et al. ............... 370/394 |
| 2009/0300248 | A1* | 12/2009 | Beaman ....................... 710/112 |
| 2012/0185447 | A1* | 7/2012 | Zhang et al. ................ 707/693 |
| 2013/0018851 | A1* | 1/2013 | Jayaraman et al. .......... 707/692 |

\* cited by examiner

*Primary Examiner* — Joseph E Avellino
*Assistant Examiner* — Marshall McLeod
(74) *Attorney, Agent, or Firm* — Polsinelli PC

(57) ABSTRACT

Implementations of the present disclosure involve a system and/or method for joining read requests for the same data block sent to a storage appliance. The system and method is configured to receive the first read request for the data block at an I/O layer of the storage appliance. The I/O layer is configured to manage obtaining data blocks from one or more storage devices on the storage appliance. The system and method may then receive a second read request for the data block at the I/O layer of the storage appliance. The first and second read request may then be joined at I/O layer and only a single copy of the data block is returned to a cache in response to the first and second read requests.

17 Claims, 7 Drawing Sheets

METHOD AND APPARATUS FOR JOINING READ REQUESTS

FIELD OF THE DISCLOSURE

Aspects of the present disclosure relate to network file systems utilizing storage appliances, such as ZFS storage appliances. More particularly, aspects of the present disclosure involve an apparatus and method for reducing the number of read requests to persistent storage, such as spinning disks, by joining read requests of the same data.

BACKGROUND

As the number of computing devices increase across society, electronic data management has become increasingly challenging. Modern devices create and use ever increasing amounts of electronic data ranging from digital photos and videos, to large data sets related to any number of topics including energy exploration, human resources, seismic activity, and gene research. This explosion in digital data has naturally led to ever increasingly large amounts of data that must be stored. Correspondingly, the data storage field is under constant pressure to increase size, performance, accessibility, reliability, security, and efficiency of data storage systems.

In order to meet these demands for data storage, various storage systems have been developed. Large scale storage systems often include storage appliances that include arrays of spinning hard drives, magnetic tape drives, and/or solid state drives. Multiple storage appliances may be networked together to form a cluster. A cluster of storage appliances provides for added capacity as well as added redundancy, as compared to a single appliance. Storage appliances in a cluster may be configured to mirror data so that if one of the storage appliances becomes inoperable for any reason, the data is still available at another location.

Referring to FIG. 1, a storage network 100 is depicted. This storage network includes one or more storage appliances 110, 120 each including one or more disk drives. As mentioned, the appliances may be clustered. The storage network 100 is accessible by clients 130, 132, 134, 136 using a network 140. Generally speaking, the storage appliance (or appliances) manages the storage of data on disk drives. The depicted networks may be local in nature or geographically dispersed such as with large private enterprise networks or the Internet.

The storage appliances 110, 120 may include any conventional storage appliance such as a ZFS storage appliance. ZFS is a combined file system and volume manager designed by Sun Microsystems® in 2005 that allows for data integrity verification and repair, high storage capacities, along with numerous other features. ZFS based systems utilize storage pools (often referred to as zpools) constructed of virtual devices (often referred to as vdevs) constructed of block devices. A block device is any device that moves data in the form of blocks including hard disk drives and flash drives. A virtual device may span a number of block devices and a zpool may include one or more vdevs, each including one or more partitions of hard drives or one or more hard drives.

Traffic to and from the storage appliances 110, 120 is typically managed by the one or more dedicated storage servers located within the appliances. A common protocol used for managing these storage appliances 110, 120 is the network file system, commonly abbreviated "NFS." NFS is a widely used distributed file system protocol, originally developed by Sun Microsystems in 1984, and currently in version 4 (NFSv4). NFS allows users at the clients 130-136 to access the stored data seamlessly by providing a programming interface found on the storage appliances 110, 120. The programming interface enables the creation and deletion of files, reading and writing of files, performing seeks within a file, creating and deleting directories, managing directory contents, and any other file operation. The operating system running on each of the clients 130-136 is configured to utilize the programming interface in order to manage the file system and to facilitate the interaction of executing applications with data residing in the storage appliances 110, 120.

In this example, the storage appliances 110, 120 are configured to operate using NFSv4. Generally, NFS systems are configured to separate the storage of file-system metadata and the files themselves. The metadata describes the location of the files on the storage appliances' disk drives that the clients 130-136 are attempting to access. NFS is a "stateful" protocol meaning the storage appliances 110, 120 each maintain a log of current operations being performed by the clients 130-136. This log is often referred to as "state table."

Each storage appliance 110, 120 is aware of the pools that are collectively being served by the storage appliances 110, 120. Each pool has a corresponding distributed stable storage (DSS) path where the storage server writes persistent data about each client 130-136 when the client first contacts the server. This data may be used to identify data owned by a client if the client becomes disconnected from the storage server or storage appliances 110, 120.

Any time that a computing device must perform input/output (I/O) operations, the speed of the computing device is slowed. Any calls to memory, whether the memory is cache, random access memory (RAM), or persistent storage such as a conventional spinning hard drive, are costly, in that they cause the computing device to waste of clock cycles as the system waits for the requested data to be pulled from memory. Depending on the type of memory, the cost of reading from the memory is more or less costly. For example, reading from cache memory is faster than reading from random access memory (RAM), which is faster than reading from persistent storage such as a traditional spinning hard drive.

Software applications often require files or application data in order to function at a basic level. Once a user starts the application, the application will start making I/O requests as it needs application data to operate. As the user causes the application to perform additional operations, the number of I/O operations needed for the application to function increases beyond the basic level of I/O. I/O operations are limited by the I/O bandwidth, often referred to as Input/Output per second (IOPS). I/O bandwidth is a limited resource, meaning that only so many IOPS may be performed. Thus, the fewer the I/O requests made for running an application at a basic level, the higher the I/O bandwidth that can be provided to the application.

Each I/O request made by an application may be placed in an I/O queue. The I/O queue operates fairly conventionally in a first-in-first-out manner. If a computing system is under a light load, the I/O queue is minimal and I/O requests spend little time in the I/O queue. As a computing system uses more I/O, the computing system will reach a maximum level of IOPS, at which the I/O queue will expand in length, increasing the time it takes to perform operations.

Not all read requests have the same priority. For example, sometimes an application will issue a read request when the application needs the data block being requested. In other cases, applications will issue read requests that are "prefetches" that are for data blocks being requested in anticipation of needing the data blocks at a later time. One issue with an application prefetching data is that it may lead to the computing system reading the data from memory twice as well as filling up the I/O queue with requests that may never need to be fulfilled. For example, an application may anticipate that it will need a data block so it issues a prefetch. Before the prefetch read is made, the application may immediately need the data block and so the application issues an additional read request. In this case, the two read request have been added to the I/O queue for the same data block and I/O bandwidth is wasted by reading the data twice, once for each request.

In a storage system that utilizes ZFS, data is broken into blocks simply referred to as "data blocks." In the simplest terms, one logical data block corresponds to a specific number of bytes of physical disk space, for example 512B, 1 KB, 2 KB, or any other size. A data block is often the smallest unit of storage that can be used or allocated. Various files and information may span a portion of a data block, a complete data block, or across a plurality of data blocks. For example, a contiguous series of data blocks used for storing a specific type of information is referred to as an "extent" and a set of extents allocated for a specific object are referred to as a "segment." In ZFS systems, data is stored in storage pools that may span more than one physical storage device. Despite these storage pools spanning more than one physical storage device, from the outside they simply look like one large storage device.

When retrieving data from persistent storage, multiple data requests may be made for the same data block. Traditionally, these requests may be combined only if the request is for data residing on the same physical device. Thus, for blocks and segments that span across multiple physical devices, two requests for the same data at the same time result in two reads from memory, needlessly wasting I/O bandwidth.

It is with these and other issues in mind that various aspects of the present disclosure were developed.

SUMMARY

Implementations of the present disclosure involve a system and/or method for joining read requests for the same data block sent to a storage appliance. The system and method is configured to receive the first read request for the data block at an I/O layer of the storage appliance. The I/O layer is configured to manage obtaining data blocks from one or more storage devices on the storage appliance. The system and method may then receive a second read request for the data block at the I/O layer of the storage appliance. The first and second read request may then be joined at I/O layer and only a single copy of the data block is returned to a cache in response to the first and second read requests.

DETAILED DESCRIPTION

Implementations of the present disclosure involve an apparatus and/or method for joining I/O requests made in a storage system. In particular, the present disclosure provides for a system and method for identifying read requests in an I/O queue and combining or otherwise joining multiple requests for the same data blocks to reduce the number duplicate read requests in an I/O queue. The present disclosure also provides for dynamically adjusting the priority of all reads being issued to storage disks, increasing the priority of a read if a read for the same data is further ahead in the I/O queue. By allowing for this dynamic adjustment, applications may issue low-priority prefetch reads at any time without having to worry about their effect on high-priority reads that may be required at a later time. Furthermore, read requests for the same logical data may be combined into a single read request.

Figure 1:
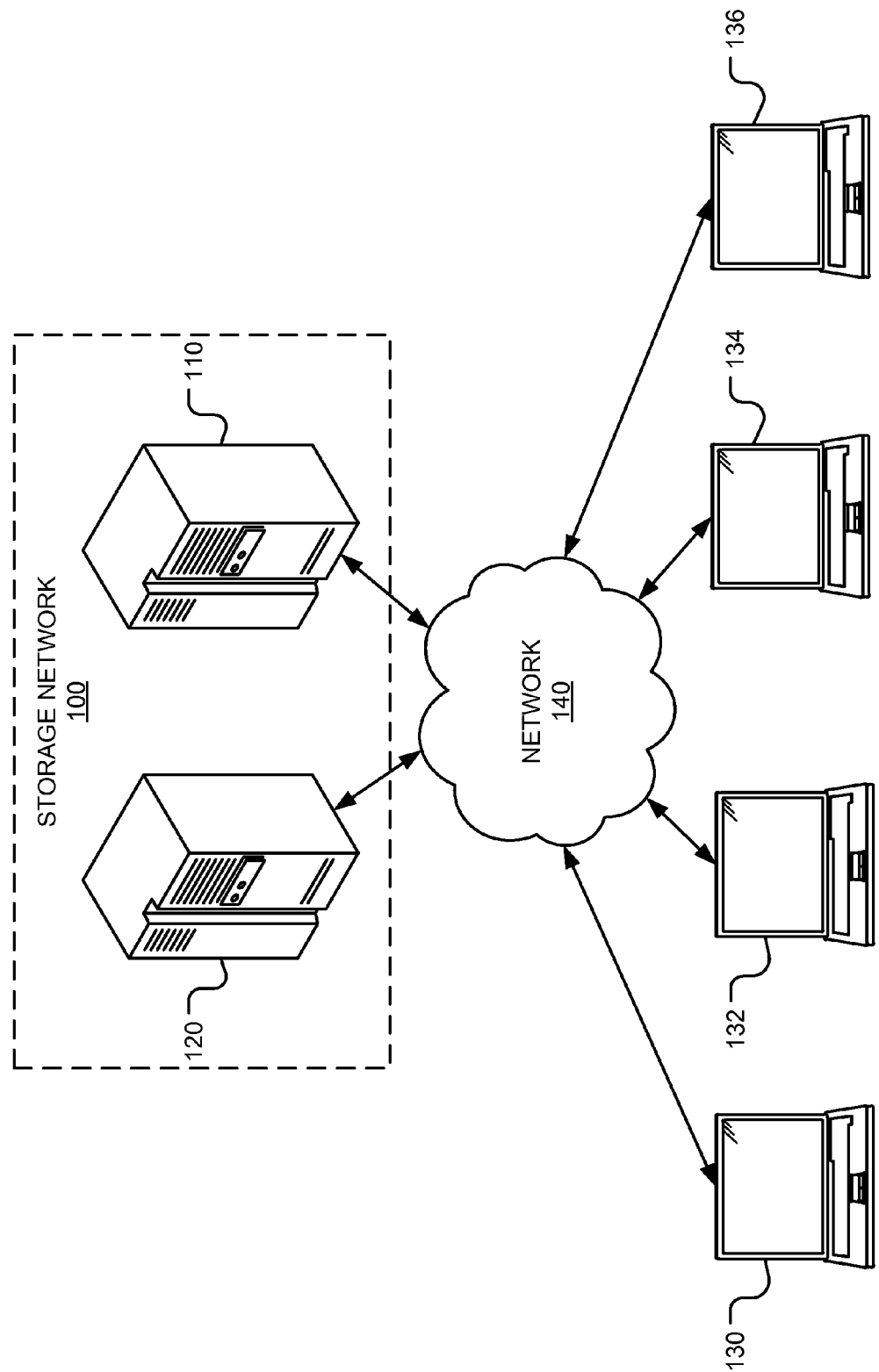
FIG. 1 is a block diagram illustrating an example of a data storage system.
Figure 2:
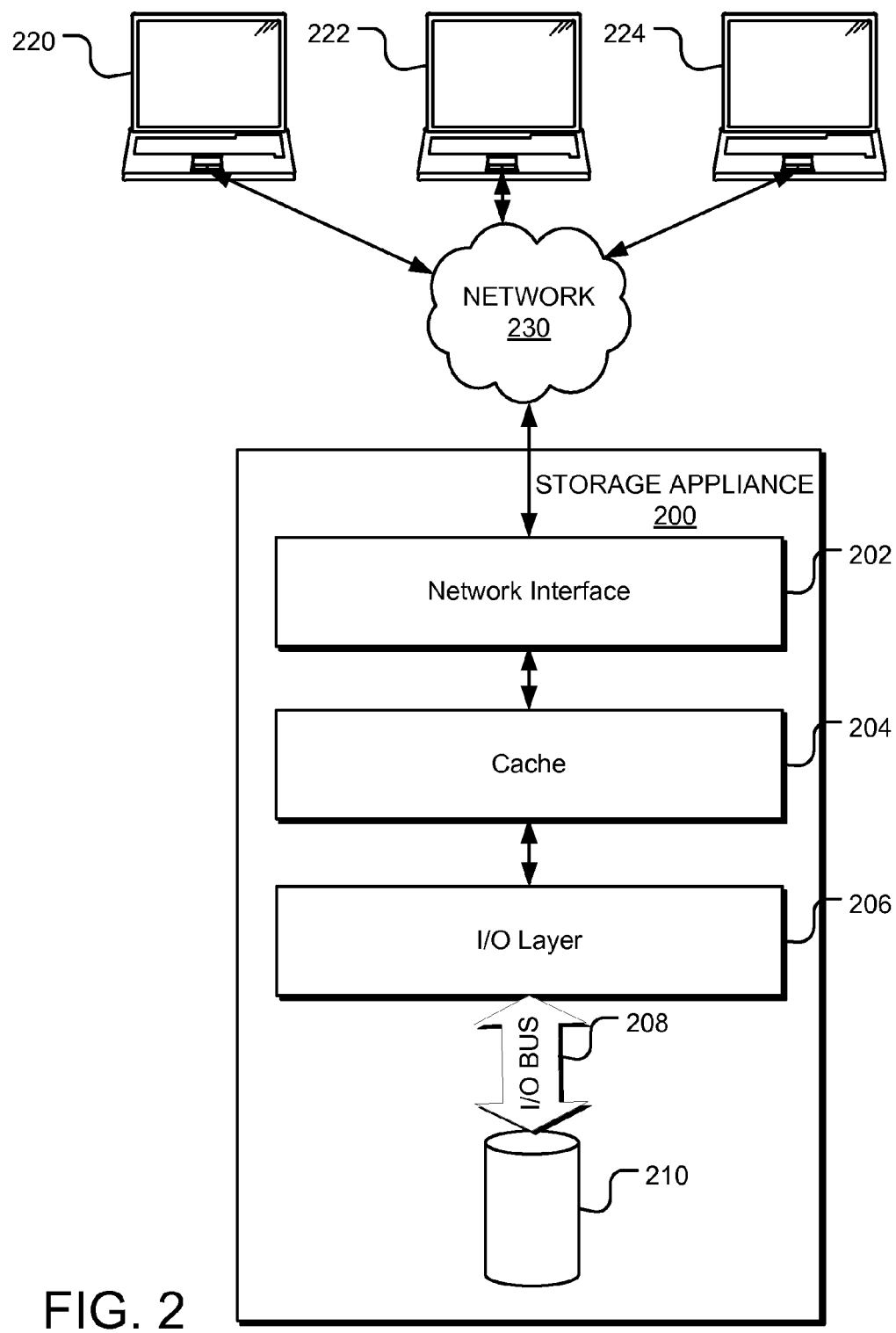
FIG. 2 is a block diagram illustrating an example of a system for joining multiple read requests.
Figure 3:
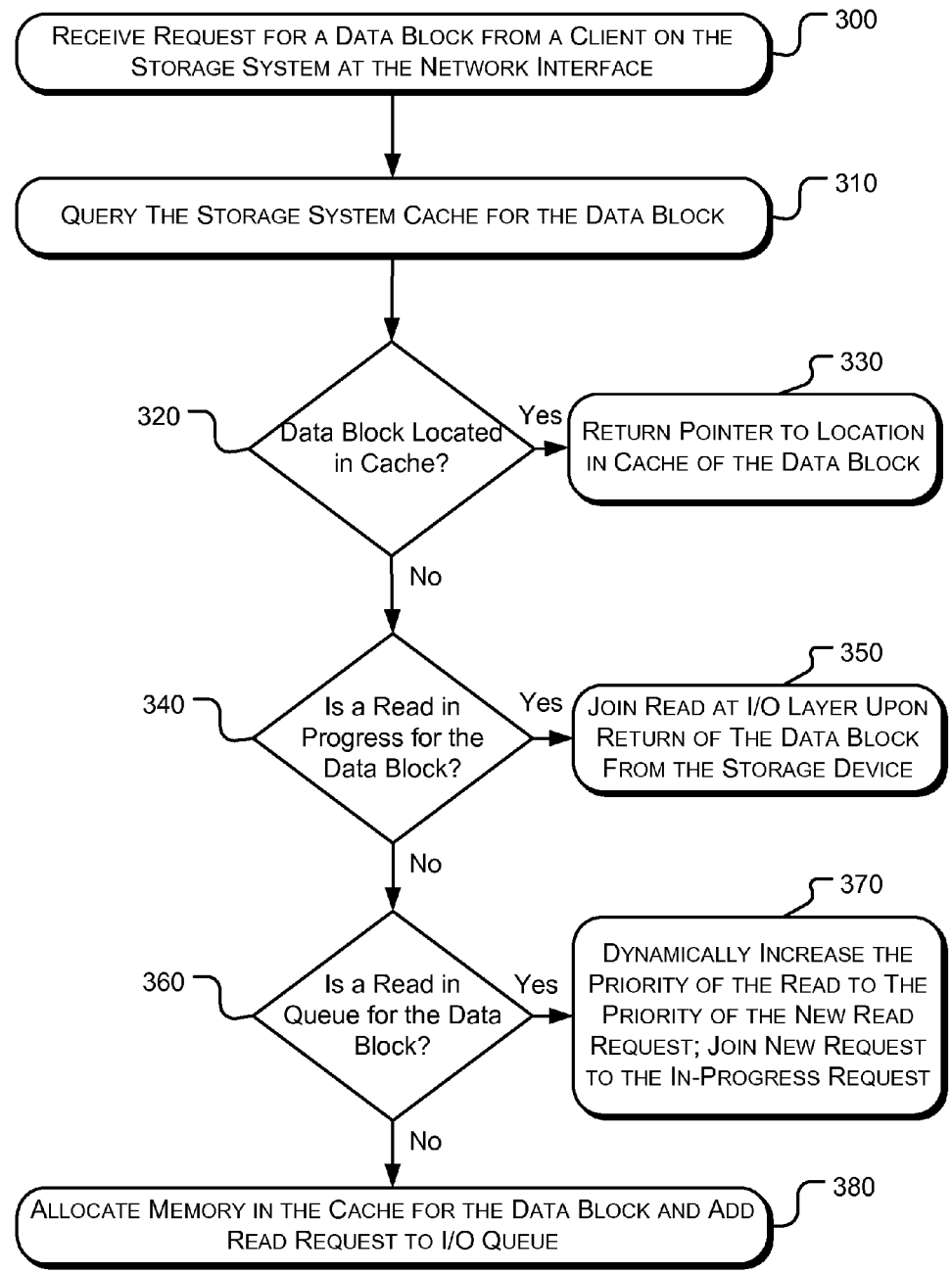
FIG. 3 is a flow diagram illustrating an example method for joining multiple read requests.

Referring now to FIGS. 2 and 3, an example of a storage system 200 that operates according to the present disclosure and method of joining read requests are depicted. In this example, the storage system 200 is connected to one or more clients 220, 222, 224 via a network 230. The clients 220-224 may operate in any conventional manner, issuing various requests or commands related to data stored in the storage system 200.

The storage system 200 may include any network attached storage system that is capable of receiving requests to read data stored in the storage system and to send data blocks associated with those requests. For example, the storage system 200 may comprise a conventional server with a network connection and persistent storage that may be accessible via the network 230 using secure shell (SSH) or file transfer protocol (FTP). In various other examples, the storage system 200 may be a storage appliance such as an Oracle® ZFS storage appliance operating using NFS and ZFS.

The clients 220-224 may include any conventional computing devices connected to the network. In various examples, the clients 220-224 may include consumer electronic devices such as personal computers, laptop computers, cellular phones, smart phones, tablet computers, network connected televisions, network connected digital video disk (DVD) and Blu ray players, and similar network-connected consumer computing devices, as well as commercial and industrial computing devices such as servers, mainframes, supercomputers, and the like. Each client 220-224 typically will be running one or more network connected applications that may request (read) data blocks from the storage system 200 (operation 300). These data blocks may include information that is either needed immediately and is therefore of relatively high-priority or may include data blocks that the application anticipates will be needed in the near future (e.g., prefetches) and are therefore relatively low-priority. The amount of data blocks requested by the clients 220-224 may vary over time given a current workload, but may also always need a minimum bandwidth of data blocks in order to operate even when the client is relatively idle.

The network 230 may include any type of conventional or non-conventional network capable of linking one or more clients 220-224 to the storage system 200 and allowing for the passage of data blocks between the clients 220-224 and the storage system 200. For example, the network 230 may range from including a local area network that is only accessible by a few clients, to a wide area network such as the Internet and be accessible by nearly any computing device with an Internet connection.

Requests to read data may be sent by the clients 220-224 over the network 230 to the storage appliance 200, and may be received at a network interface 202. Any requests to read a data block and the subsequent sending of that data block from the storage appliance 200 may be processed through the network interface 202. Specifically, read requests issued by the clients 220-224 may be received by the storage system 200 at the network interface 202, and the requested data blocks are sent to the clients via the network interface 202. The network interface 202 may include any conventional network connection such as a typical 10/100/1000 Ethernet connection, fiber optic connection, or wireless connection such as a 802.11 WiFi connection or cellular connection. In this example, the network interface 202 may also include any additional I/O processing layers or intermediaries that may be necessary for processing and sending read requests to the cache 204 and subsequently sending data blocks to the clients 220-224.

When read requests for data blocks are received by the storage system 200 at the network adapter 202, the cache 204 may be queried for the requested data block (operations 310, 320). At a high level, the cache is a mechanism by which to increase the speed of reading and writing data to persistent memory, and to blunt the overall system impacts associated with reading and writing data to disc. The cache 204 may include a relatively small amount of high-speed, non-persistent memory, such as direct random access memory (DRAM). In various examples, the cache 204 may be used as temporary storage for data blocks that were recently retrieved from the relatively slower but persistent storage device 210 connected to the storage system 200. For example, when a data block from a prefetch is returned from the persistent storage 210, it may be stored in the cache until the requesting client 220-224 issues a read for the data block. The results of read requests may also be stored in the cache 204, but when these results are returned, the requesting client 220-224 may be notified. In various examples, the cache 204 may also be used to store data blocks that are the most frequently requested or the most recently requested data blocks. In many cases, reading a data block from the cache 204 may be significantly faster as compared to reading the same block from the storage device 210. If the cache 204 has the requested data block stored in it, a reference or pointer to the location of the data block may be sent to the network interface 202 and the network interface 202 may subsequently send the data block to the requesting client (operation 330). If the data block is not presently stored in the cache 204, a request to retrieve the data block from the storage device 210 may be made.

In one specific example, the storage device 210 involves a collection of spinning disc drives such as hard disc drives. However, the storage device 210 may include any persistent or non-persistent storage connected to the storage system 200 via an I/O layer 206 and an I/O bus 208. For example, the storage device 210 may include random access memory (RAM), hard disk drives, solid state drives, attached physical media such as Compact Disks (CDs), DVDs, Blu ray disks, FLASH drives and any other types of physical storage devices that may be attached to the storage system 200. In one example where the storage server 200 operates using ZFS, the storage device 210 may include more than one physical storage device arranged in a storage pool or zpool. In various other examples, a plurality of physical storage devices, such as hard disk drives, may be arranged into one or more virtual devices, and the virtual devices may be arranged into one or more zpools.

Returning again to the cache 204, it may request a data block from the storage device 210 when the cache 204 does not have the data block stored in it. Organizing requests for data blocks and retrieving the data blocks may be done by the I/O layer 206. The I/O layer 206 includes a data structure for scheduling read requests and interfaces with an I/O data bus 208 connected to the storage device 210. When a read request is made, the I/O layer may send the request to the storage device 210 over the I/O bus 208.

The I/O bus 208 may comprise any conventional data bus that may be used to connect the I/O layer 206 to the storage device 210. The I/O bus may also have a limited bandwidth and speed.

Once the requested data block has been found on the storage device 210, it is sent via the I/O bus 208 back to the I/O layer which may subsequently deposit the data block in cache 204. The I/O layer 206 may schedule the order of the performance of reads according to a read priority, the order that the read was received, or a combination of the two. For example, the I/O layer 206 may include a queue or similar data structure for scheduling first-in-first-out (FIFO) operations as well as a listing of any in-progress I/O operations where requests for data blocks have been sent to the storage device 210, but the data has yet to be returned to the I/O layer 206.

In one example, the queue may not operate completely as a FIFO data structure, but instead may allow for high-priority read requests to be placed ahead of low-priority read requests. Read requests may be assigned a priority based on whether the read request is a prefetch or a request for immediate use. A prefetch in many cases, may be assigned a low priority, while a read may be assigned a high priority. The priority of a given request may be identified by setting a priority tag. In another example, the I/O layer 206 may dynamically update the priority of a request and move the request ahead in the queue according to the upgraded priority.

For example, when a data block is requested by the cache 204, the I/O layer 206 may return whether the data block has been previously requested or is currently in progress with the request waiting for the data block to return from the storage device 210 (Operation 340). For example, in many I/O systems, a request to the persistent storage may be made over the I/O bus 208 and the request containing information about the requester may wait at the I/O layer 206 for the data block to be retrieved. The I/O layer 206 may recognize that a request for a data block has been made and the original request is currently waiting for the data block to be returned. For example, the I/O layer 206 may "block" the execution of the new request until the data block from original request has been returned to the I/O layer from the storage device 210. The I/O layer 206 may join the new request to the waiting original request for the data block (Operation 350).

If an I/O request is not already in progress, the I/O layer 206 may return whether the requested data block is already in the I/O queue while waiting to be requested from the storage device 210 (operation 360). If the I/O is already being performed on the requested data block (e.g. a read request for the data block is already present in the I/O queue) the priorities of the two read requests may be compared. If the newer (second) read request has a higher priority than the older (existing or first) read request, the priority of the first read request may be dynamically matched with the priority of the second read request and the first read request may be moved ahead in the queue in accordance with its new priority. If the new read request does not have a higher priority than the old read request, then the old read request may stay in the same position in the I/O queue. In each case, the second read request may then be joined with the first read request (operation 370)

since both requests are for the same data and there is no need to read the same data block twice. In another example, a first read request priority may be increased based on the number of additional read requests that are joined with it.

In many cases, there is not an existing request to join. Stated differently, it is often the case that a read request for data is not made at relatively the same time as another read request for the same data so the I/O layer 206 is not working on obtaining the block from storage. If the read request for the data block is not in progress and not already in the I/O queue, the read request may be added to the I/O queue and space for storing the data block when it is returned from the storage device 210 may be allocated in the cache 204 (operation 380).

Figure 4:
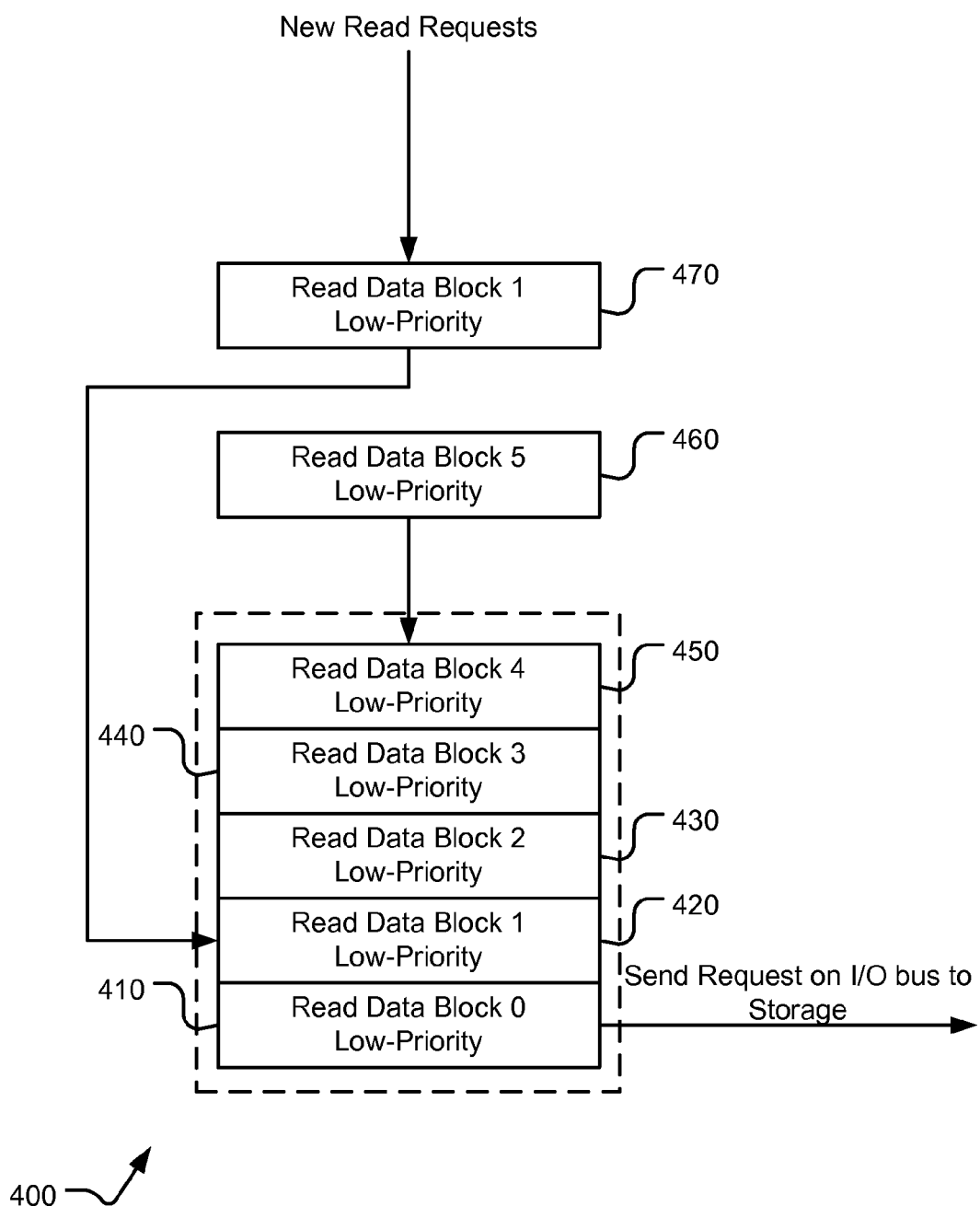
FIG. 4 is a block diagram illustrating an Input/Output queue joining read requests that have the same or lower-priority.

Referring now to FIG. 4, an example of an I/O queue 400 located in the I/O layer 206. The example queue is populated with various read requests. In this simplified example, the I/O queue 400 includes read requests for five different data blocks 410-450 (block 0-block 4) when an additional read request for a sixth data block (block 5) is added to the queue. Since the newly requested data block 460 is a low-priority or same priority request, the read request 460 may be added to the end of the I/O queue 400. For example, one low-priority request may originate from a first client running a first application and a second low-priority request for the same data block may come from a second client running a second application. After the addition of the sixth data block 460, the cache 204 issues another new low-priority or same priority request to read data block 1 that is already in the I/O queue 400. Since the new read request 470 is requesting the same data being requested by an earlier request 420, the new read request 470 may be joined with the previous request 420.

Each request for a data block may include any relevant information for obtaining the data block and returning it to the requesting client. For example a read or prefetch may include the data block being requested as well as an identifier for the requesting client such as a callback address. When two requests are joined, the identifier for the requesting client may be updated to include the identifier for the requesting client of the joining request. In some cases, the same client may be making both requests, for example in the case of a prefetch the data block brought back from the storage device 210 is placed in the cache 204 so that when the client application requests the data block, it is already in the cache 210. With a read request, once the data block is placed in the cache 204, a callback function may be notified to alert the client application that the requested data block is ready.

Figure 5A:
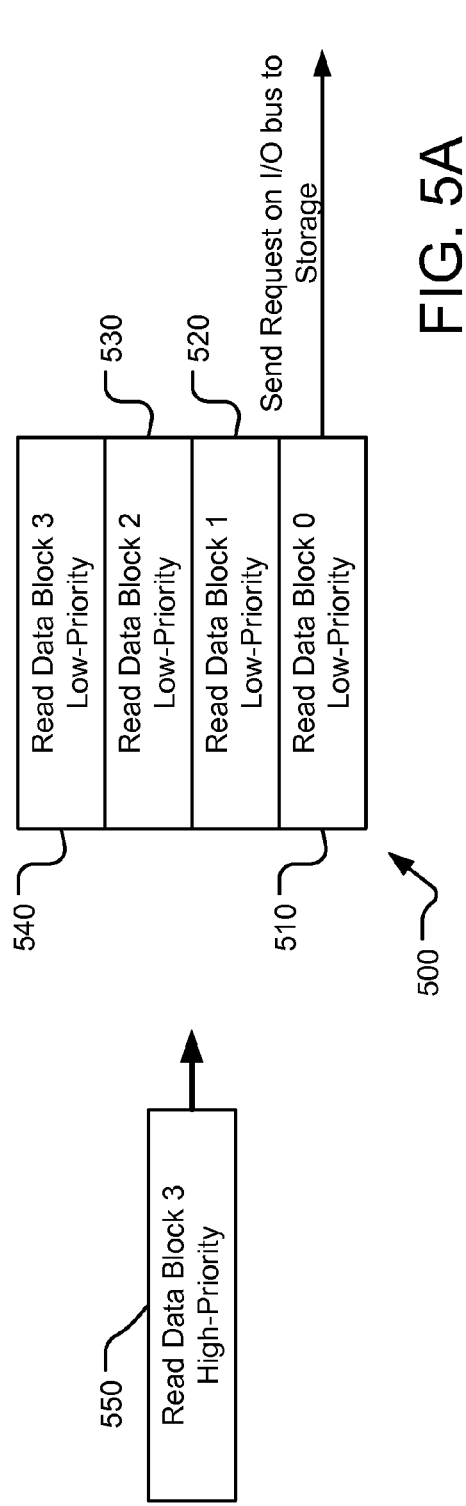
FIGS. 5A-C is a block diagram illustrating an Input/Output where a low-priority read request is dynamically upgraded to a high-priority read request upon the receipt of a high-priority read request for the same block of data in the low-priority request.
Figure 5B:
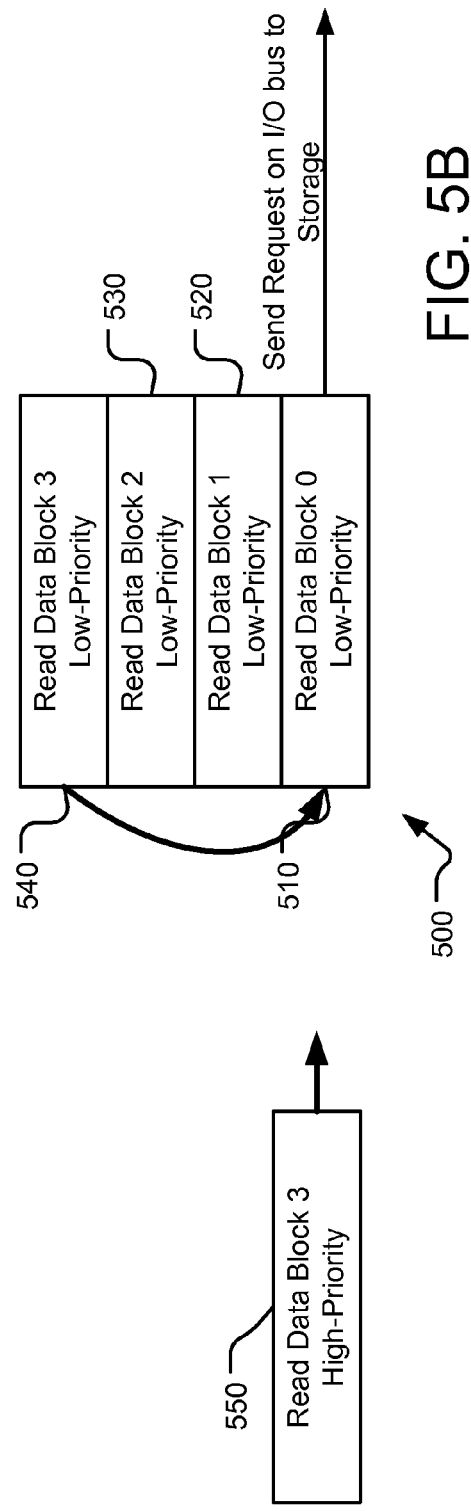
Figure 5C:
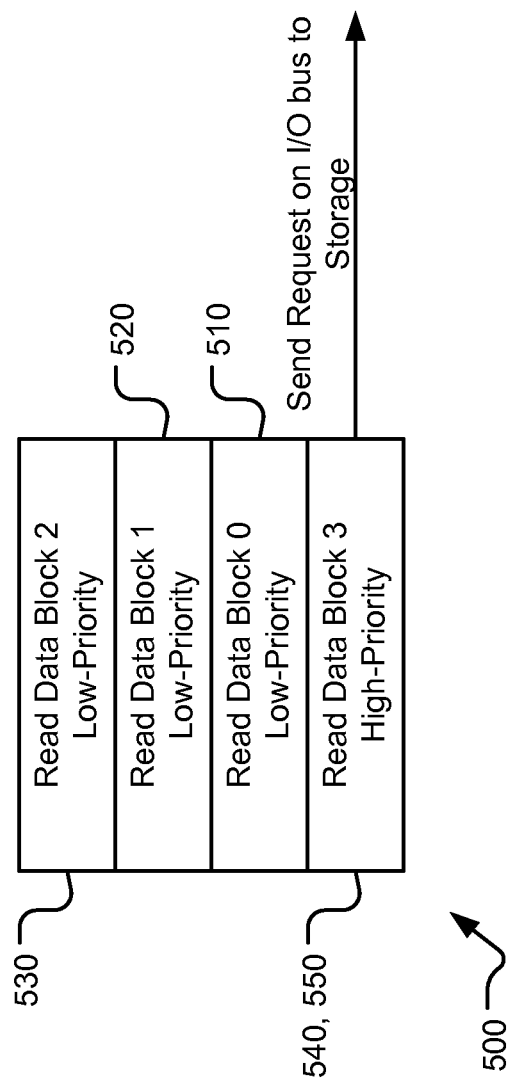

Referring now to FIG. 5A, an example managing the I/O queue 500 to address receiving high-priority read requests for the same data as an earlier queue low-priority request is depicted. In this example, the I/O queue includes four low-priority read requests 510-540 for different data blocks (0-3), when the cache issues a high-priority read request I/O the I/O layer 206. In this case, the new high-priority read request 550 is requesting the same data block 3 as a low-priority read request 540 already in the I/O queue 500. Referring now to FIG. 5B, in this case, the I/O layer 206 may dynamically increase the low-priority read request 540 to the priority level of the incoming high-priority read request 550. Moving on to FIG. 5C, the incoming high-priority read request 550 may then be joined with the previous request 540.

Figure 6:
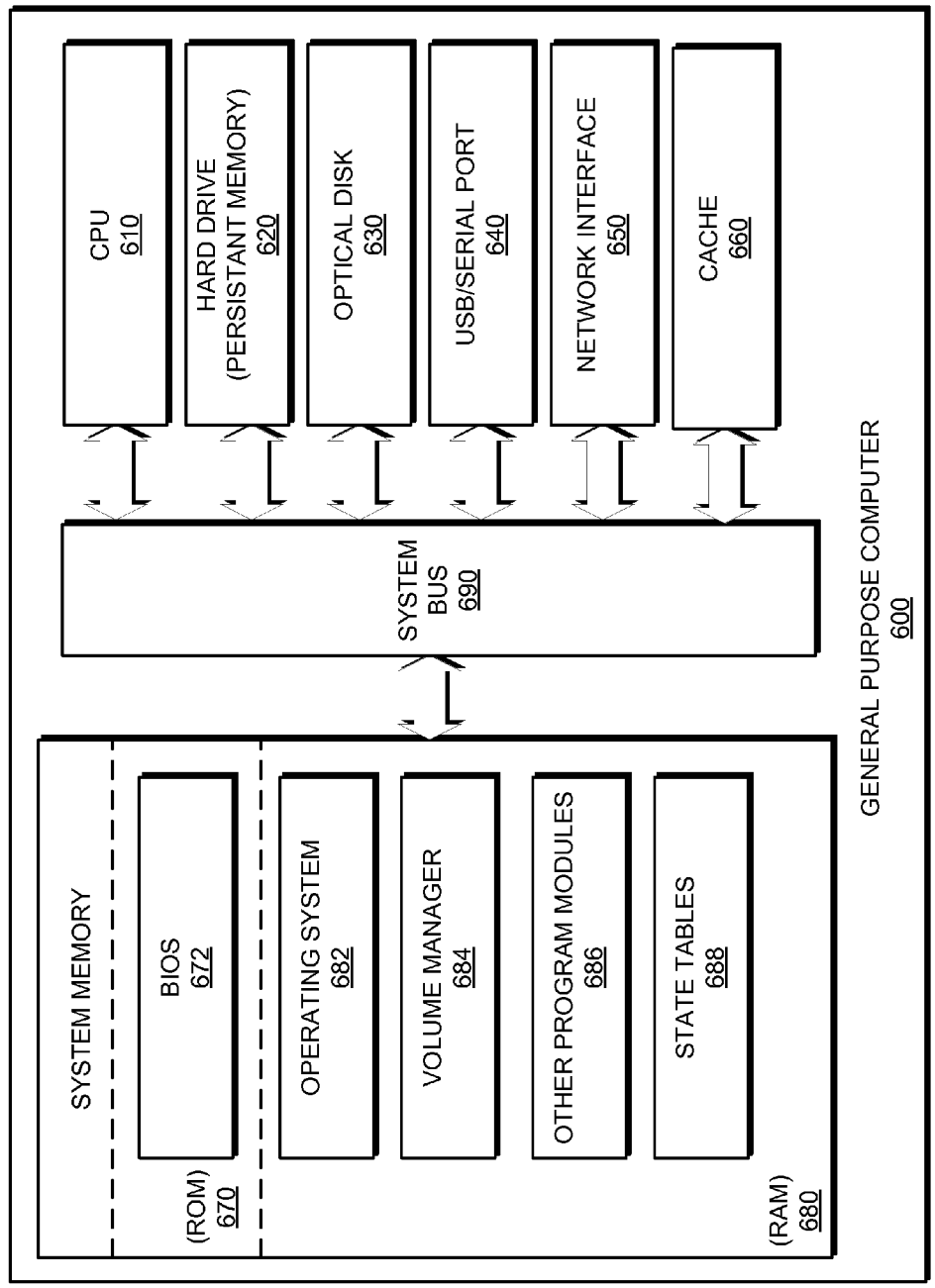
FIG. 6 is a block diagram illustrating an example of a general purpose computing system that may be used in the application of the present disclosure.

FIG. 6 illustrates an example general purpose computer 600 that may be useful in implementing the described technology. The example hardware and operating environment of FIG. 6 for implementing the described technology includes a computing device, such as general purpose computing device in the form of a personal computer, server, or other type of computing device. In the implementation of FIG. 6, for example, the storage system 200 includes a processor 610, a cache 660, a system memory 670, 680, and a system bus 690 that operatively couples various system components including the cache 660 and the system memory 670, 680 to the processor 610. There may be only one or there may be more than one processor 610, such that the processor of storage system 200 comprises a single central processing unit (CPU), or a plurality of processing units, commonly referred to as a parallel processing environment. The storage system 200 may be a conventional computer, a distributed computer, or any other type of computer; the invention is not so limited.

The system bus 690 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 670 and random access memory (RAM) 680. A basic input/output system (BIOS) 672, containing the basic routines that help to transfer information between elements within the storage system 200 such as during start-up, is stored in ROM 670. The storage system 200 further includes a hard disk drive 620 for reading from and writing to a persistent memory such as a hard disk, not shown and an optical disk drive 630 for reading from or writing to a removable optical disk such as a CD ROM, DVD, or other optical media.

The hard disk drive 620 and optical disk drive 630 are connected to the system bus 690. The drives and their associated computer-readable media provide nonvolatile storage of computer-readable instructions, data structures, program engines and other data for the storage system 200. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, optical disk, ROM 670, or RAM 680, including an operating system 682, a NFS client 684, one or more application programs 686, and program data such as state tables 688. A user may enter commands and information into the storage appliance 212, 310 through input devices such as a keyboard and pointing device connected to the USB or Serial Port 640. These and other input devices are often connected to the processor 610 through the USB or serial port interface 640 that is coupled to the system bus 690, but may be connected by other interfaces, such as a parallel port. A monitor or other type of display device may also be connected to the system bus 690 via an interface, such as a video adapter 660. In addition to the monitor, computers typically include other peripheral output devices (not shown), such as speakers and printers.

The storage appliance 212, 310 may operate in a networked environment using logical connections to one or more remote computers. These logical connections are achieved by a network interface 650 coupled to or a part of the storage appliance 212, 310; the invention is not limited to a particular type of communications device. The remote computer may be another computer, a server, a router, a network PC, a client, a peer device, a network storage appliance such as a ZFS storage appliance, or other common network node, and typically includes many or all of the elements described above relative to the storage appliance 212, 310. The logical connections include a local-area network (LAN) a wide-area network (WAN), or any other network. Such networking environments are commonplace in office networks, enterprise-wide computer networks, intranets and the Internet, which are all types of networks.

The network adapter 650, which may be internal or external, is connected to the system bus 550. In a networked environment, programs depicted relative to the storage appliance 212, 310, or portions thereof, may be stored in the remote memory storage device. It is appreciated that the network connections shown are example and other means of and communications devices for establishing a communications link between the computers may be used.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method of joining read requests comprising:
receiving a first read request for a prefetch of a data block at an I/O layer, the I/O layer managing obtaining the data block from one or more storage devices by maintaining an I/O queue, the I/O queue comprising a plurality of read requests ordered based on when the I/O layer receives each of the plurality of read requests in a first-in-first-out manner and a priority tag associated with each of the plurality of read requests, wherein the priority tag comprises only a high priority indication or a low priority indication, the first read request comprising a first priority tag corresponding to the low priority indication and the prefetch;
receiving a second read request for immediate use for the data block at the I/O layer, the second read request comprising a second priority tag corresponding to the high priority indication and the immediate use of the data block, wherein the first priority tag is a lower priority than the second priority tag;
at the I/O layer, joining the first request for the data block with the second request for the data block by increasing the first priority tag of the first read request to match the second priority tag of the second read request;
dynamically adjusting the I/O queue to move the joined first read request and second read request for the data block to the front of the I/O queue according to the second priority tag of the second read request; and
returning the data block to a cache, the cache only receiving one data block in response to the first and second request.

2. The method of claim 1, wherein the one or more storage devices are connected to a storage appliance, the I/O layer operating on the storage appliance to manage obtaining the data block from the one or more storage devices.

3. The method of claim 1, wherein the first read request exits the I/O queue and the I/O layer is obtaining the data block from the one or more storage devices in response to the first read request, but has yet to obtain the data block from the one or more storage devices, the I/O layer holding the first read request at the I/O layer and upon receiving the second read request, joins the second request to the first request so that only a single request to the one or more storage devices is made for the data block.

4. The method of claim 1, wherein the I/O queue is further configured to process requests such that the second request with the second priority is placed in front of requests with a lower priority.

5. The method of claim 1, wherein the second read request comprises a read, and the read is joined to the prefetch before the data block is returned to the cache.

6. The method of claim 1, wherein the first read request comprises a read request from a first client application and the second read request comprises a read request from a second client application, wherein the first read request and the second read request are joined and the data block is returned to both the first client application and the second client application.

7. A storage appliance comprising:
a processor coupled with a memory, wherein the processor is configured to execute instructions stored in the memory to dynamically adjust a priority of all reads being issued to one or more storage devices, the instructions for dynamically adjusting the priority of all reads to a persistent storage comprising:
receiving a first read request for a prefetch of a data block at an I/O layer of the storage appliance, the I/O layer managing obtaining the data block from the one or more storage devices by maintaining an I/O queue, the I/O queue comprising a plurality of read requests ordered based on when the I/O layer receives each of the plurality of read requests in a first-in-first-out manner and a priority tag associated with each of the plurality of read requests, wherein the priority tag comprises only a high priority indication or a low priority indication, the first read request comprising a first priority tag corresponding to the low priority indication and the prefetch;
receiving a second read request for immediate use for the data block at the I/O layer of the storage appliance, the second read request comprising a second priority tag corresponding to the high priority indication and the immediate use of the data block, wherein the first priority tag is a lower priority than the second priority tag;
at the I/O layer, joining the first request for the data block with the second request for the data block by increasing the first priority tag of the first read request to match the second priority tag of the second read request;
dynamically adjusting the I/O queue to move the joined first read request and second read request for the data block to the front of the I/O queue according to the second priority tag of the second read request; and returning the data block to a cache, the cache only receiving one data block in response to the first and second request.

8. The storage appliance of claim 7, wherein the I/O layer of the one or more storage devices is configured such that the first read request for the data block is added to the I/O queue configured to process requests in the first-in-first-out manner.

9. The storage appliance of claim 8, wherein the first read request exits the I/O queue and the I/O layer is in the process of obtaining the data block from the one or more storage devices in response to the first read request, the I/O layer holding the first read request at the I/O layer and upon receiving the second read request, joins the second request to the first request so that only a single request to the one or more storage devices is made for the data block.

10. The storage appliance of claim 8, wherein the I/O queue is further configured to process requests such that the second request with the higher priority is placed in front of requests with a lower priority.

11. The storage appliance of claim 8, wherein the second request comprises a read, and the read is joined to the prefetch before the data block is returned to the cache.

12. The storage appliance of claim 8, wherein the first read request comprises a read request from a first client application and the second read request comprises a read request from a second client application, wherein the first read request and the second read request are joined and the data block is returned to both the first client application and the second client application.

13. A method of joining read requests comprising:
receiving a first read request for a prefetch of a data block at an I/O layer of a storage appliance, the I/O layer managing obtaining the data block from one or more storage devices of the storage appliance by maintaining an I/O queue, the I/O queue comprising a plurality of read requests ordered based on when the I/O layer receives each of the plurality of read requests in a first-in-first-out manner and a priority tag associated with each of the plurality of read requests, wherein the priority tag comprises only a high priority indication or a low priority indication, the first read request comprising a first priority tag corresponding to the low priority indication and the prefetch;
placing the prefetch request for the data block in the first-in-first-out I/O queue located in the I/O layer based on the first priority tag of the first read request;
receiving a second read request for immediate use for the data block at the I/O layer of the storage appliance, the second read request comprising a second priority tag corresponding to the high priority indication and the immediate use of the data block, wherein the first priority tag is a lower priority than the second priority tag;
at the I/O layer, determining that the data block requested by the first read request includes the data block requested by the second read request, and joining the first request for the data block with the second request for the data block by increasing the first priority tag of the first read request to match the second priority tag of the second read request;
dynamically adjusting the I/O queue to move the joined first read request and second read request for the data block to the front of the I/O queue according to the second priority tag of the second read request; and
returning the data block to a cache, the cache only receiving one data block in response to the first and second request.

14. The method of claim 13, wherein the first read request exits the I/O queue and the I/O layer is obtaining the data block from the one or more storage devices in response to the first read request, but has yet to obtain the data block from the one or more storage devices, the I/O layer holding the first read request at the I/O layer and upon receiving the second read request, joins the second request to the first request so that only a single request to the one or more storage devices is made for the data block.

15. The method of claim 14, wherein the I/O queue further configured to process requests such that the second request with the second priority is placed in front of requests with a lower priority.

16. The method of claim 13, wherein the second read request comprises a read, and the read is joined to the prefetch before the data block is returned to the cache.

17. The method of claim 13, wherein the first read request originated from a first client application in communication with the storage appliance and the second read request originated from a second client application in communication with the storage appliance, wherein the first read request and the second read request are joined and the data block is returned to both the first client application and the second client application.

* * * * *